United States Patent [19]

Ohta et al.

[11] Patent Number: 5,572,662
[45] Date of Patent: Nov. 5, 1996

[54] DATA PROCESSING APPARATUS

[75] Inventors: Hidenobu Ohta; Tatsumi Nakada, both of Kawasaki, Japan

[73] Assignee: Fujitsu Limited, Kawasaki, Japan

[21] Appl. No.: 455,723

[22] Filed: May 31, 1995

[30] Foreign Application Priority Data

Aug. 23, 1994 [JP] Japan .................................. 6-197125

[51] Int. Cl.⁶ ........................................... G06F 11/34
[52] U.S. Cl. ................................ 395/182.09; 371/68.1; 364/268.3; 364/DIG. 1
[58] Field of Search ...................... 395/183.06, 183.17, 395/183.21, 185.01, 182.09, 182.1; 371/67.1, 71, 72, 68.1; 364/285, 230.4, 262.2, 265, 268.3

[56] References Cited

U.S. PATENT DOCUMENTS

| | | |
|---|---|---|
| 4,288,658 | 9/1981 | Bieber et al. . |
| 4,442,502 | 4/1984 | Friend et al. . |
| 4,757,442 | 7/1988 | Sakota ........................... 371/47.1 |
| 4,933,940 | 6/1990 | Walter et al. ................... 371/11.3 |
| 5,029,071 | 7/1991 | Kinoshita ...................... 395/182.09 |
| 5,261,092 | 11/1993 | McLaughlin et al. ............. 395/600 |
| 5,295,258 | 3/1994 | Jewett et al. .................. 395/575 |
| 5,317,726 | 5/1994 | Horst ........................... 395/575 |
| 5,327,553 | 7/1994 | Jewett et al. .................. 395/575 |
| 5,339,404 | 8/1994 | Vandling, III .................. 395/575 |
| 5,423,024 | 6/1995 | Cheung ....................... 395/182.09 |

FOREIGN PATENT DOCUMENTS

| | | |
|---|---|---|
| 53-78748 | 7/1978 | Japan . |
| 4-211841 | 8/1992 | Japan . |

*Primary Examiner*—Robert W. Beausoliel, Jr.
*Assistant Examiner*—Albert Décady
*Attorney, Agent, or Firm*—Staas & Halsey

[57] ABSTRACT

The invention provides a data processing apparatus wherein, when a trouble of a built-in RAM is detected, stopping of the system by a comparison check of the outputs of multiple CPUs is prevented and the trouble of the built-in RAM can be removed. The data processing apparatus includes a built-in RAM error detection section for detecting that an error occurs in a built-in RAM of any of processing sections, and an inhibition section for inhibiting, when the built-in RAM error detection section detects that a built-in RAM error occurs in at least one of the processing sections, the result of comparison outputted from the comparison section originating from the occurrence of the built-in RAM error. The data processing apparatus can be applied to various computer systems wherein multiple processing sections (CPUs) perform same operation and processing is performed while the outputs of the processing sections are compared with each other to confirm that the processing sections are performing same operation.

14 Claims, 8 Drawing Sheets

F I G. 1
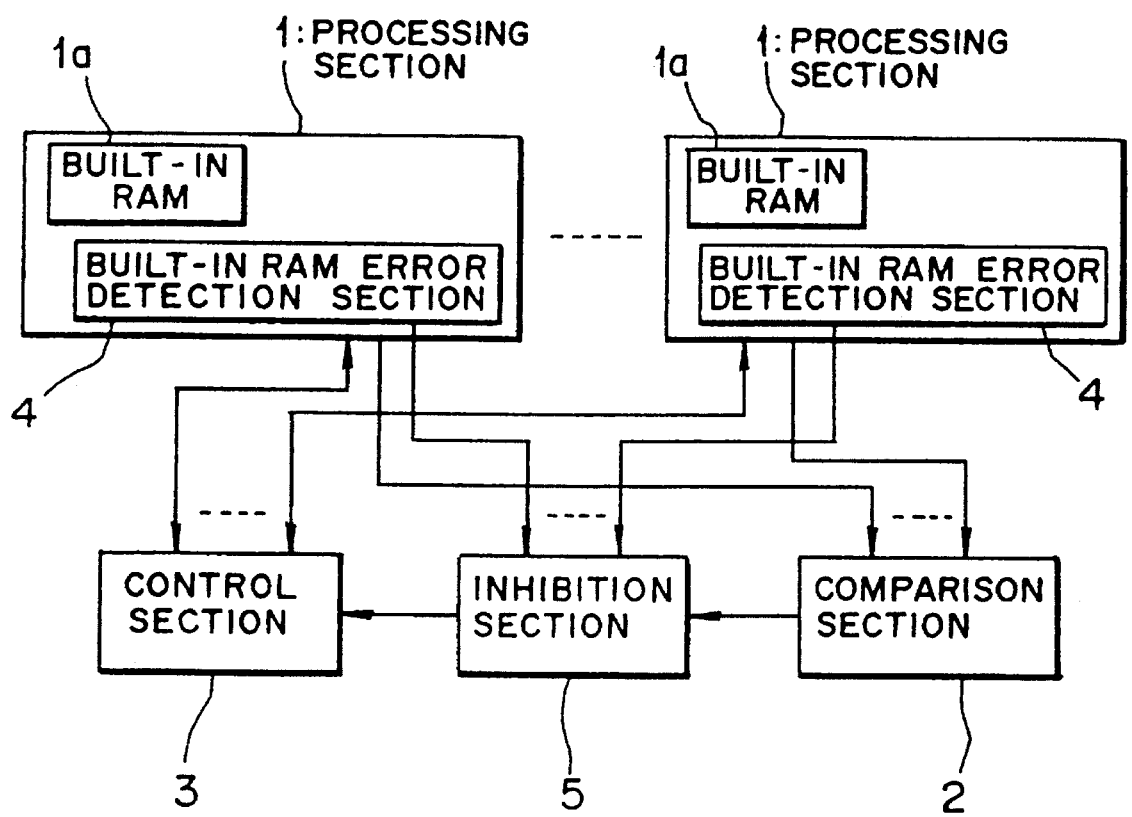

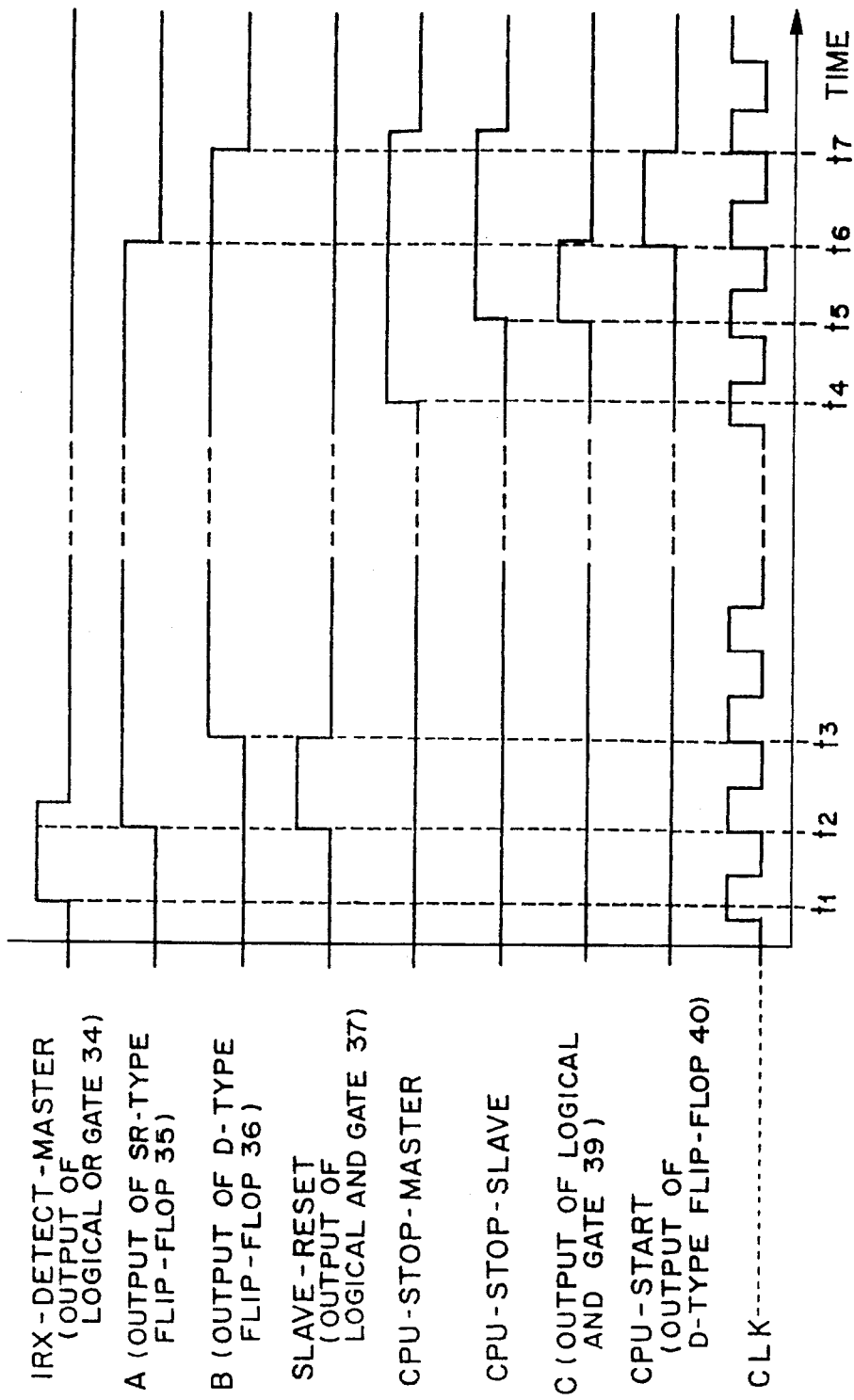

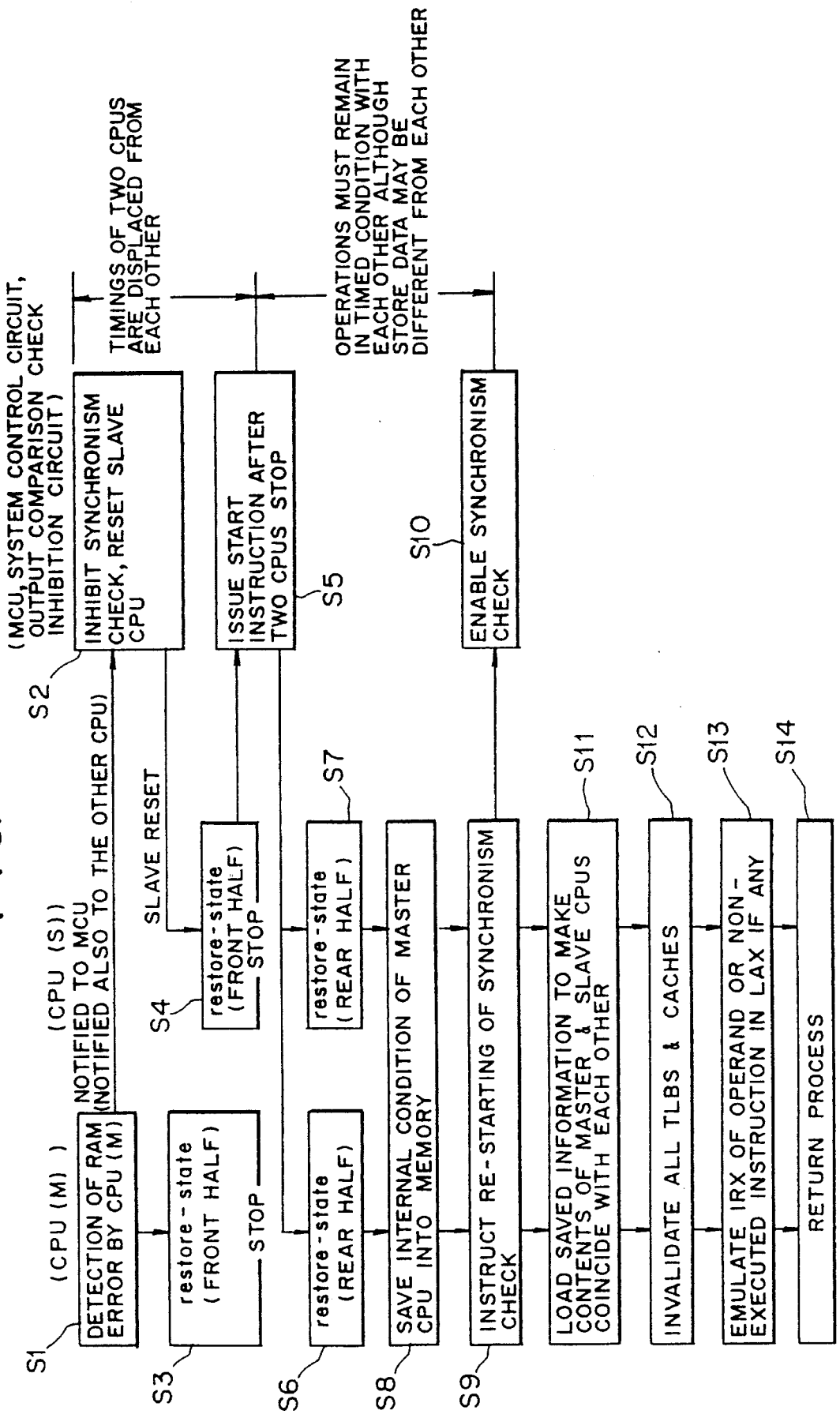

DATA PROCESSING APPARATUS

BACKGROUND OF THE INVENTION

1. Field of the Invention

This invention relates to a data processing apparatus which includes a plurality of multiple processing units (CPUs) which perform a same operation and execute processing while continuously comparing the outputs of the processing units with each other to confirm that the processing units are performing the same operation.

2. Description of the Related Art

In recent years, it is a common practice to provide, in a CPU (processing section), built-in RAMs which are used as, for example, a cache memory and a TLB (Translation Look-aside Buffer) in order to achieve high speed processing of a data processing apparatus. However, the RAM exhibits a higher frequency of failure occurrences than other circuit units constituted from gates. Further, the RAM sometimes suffers from a temporary failure (bit inversion error) by alpha rays or noise.

Meanwhile, in order to assure a high degree of reliability as a data processing apparatus, it is a common practice to provide dual CPUs in a data processing apparatus such that the CPUs perform a same operation and execute processing while continuously comparing the outputs of the CPUs with each other to confirm that they are performing the same operation.

In a data processing apparatus which includes dual CPUs in this manner, if a trouble (software error; this may be hereinafter referred to as built-in RAM error) of such a built-in RAM as described above occurs in only one of the CPUs, the two CPUs naturally operate in different manners, and consequently, they output different values from each other from respective output pins thereof, resulting in synchronism error.

Conventionally, several countermeasures against such synchronism error are available including a countermeasure wherein the entire system is stopped in order to repair the failed portion by exchange of the hardware and another countermeasure wherein the CPU in which the failure of a built-in RAM has occurred is disconnected and processing is thereafter performed only with the other CPU.

In the former conventional countermeasure against synchronism error in a data processing apparatus, however, each time a built-in RAM error, which occurs in a comparatively high frequency, occurs, the worst situation, i.e., that the system is stopped, is invited. Consequently, the countermeasure has a subject to be solved in that it is inferior in terms of the reliability and the availability. Meanwhile, according to the latter countermeasure, the worst situation of the stopping of the system is not invited. However, since operation of the data processing apparatus is performed only with one of the two CPUs, the reliability is degraded accordingly.

While the frequency in occurrence of temporary failure of a built-in RAM of a CPU is generally high, contents of a cache memory can be recovered by reading out correct contents from a main storage unit (MSU) again, and also contents of a TLB can be recovered by starting address conversion again. However, where the cache memory is controlled in accordance with a write back (store in) control method, since the latest data is not sometimes held in the main storage unit, the contents of the cache memory cannot sometimes be recovered by the technique described above. However, the contents of the cache memory can still be recovered by restoring data using such a technique such as ECC (Error Checking and Correction).

Where dual CPUs are provided, however, if one of the CPUs detects a failure of its built-in RAM and starts recovery processing, then if no built-in RAM error occurs with the other CPU, then output values from the output pins of the two CPUs become different from each other, and consequently, the system becomes stopped.

In this manner, although a failure of a built-in RAM does not invite stopping of the system where a single CPU is provided since data can be recovered, it otherwise invites stopping of the system where dual CPUs are provided. In other words, although dual CPUs are provided in order to assure a higher degree of reliability of a data processing apparatus, a built-in RAM error, which occurs at a comparatively high frequency, conversely causes stopping of the system to occur frequently as a result of comparison (synchronism checking) of the outputs of the dual CPUs. As a result, the reliability and the availability of the data processing apparatus are deteriorated.

SUMMARY OF THE INVENTION

It is an object of the present invention to provide a data processing apparatus wherein, when a trouble of a built-in RAM is detected, stopping of the system based on comparison of the outputs of dual CPUs is prevented and the trouble of the built-in RAM can be removed to assure a higher degree of reliability and availability of the system.

In order to attain the object described above, according to the present invention, there is provided a data processing apparatus, comprising a plurality of multiplex processing sections, a comparison section for comparing outputs of the processing sections, a control section for controlling the processing sections to perform a same operation, executing processing while confirming based on a result of comparison by the comparison section that the processing sections are performing the same operation, and stopping the processing when it is conformed based on the result of comparison by the comparison section that the outputs of the processing sections do not coincide with each other, a built-in RAM error detection section for detecting that an error occurs in a built-in RAM of any of the processing sections, and an inhibition section for inhibiting, when the built-in RAM error detection section detects that a built-in RAM error occurs in at least one of the processing sections, the result comparison outputted from the comparison section originating from the occurrence of the built-in RAM error.

With the data processing apparatus, when a built-in RAM error occurs, stopping of the system in response to an output comparison check of the comparison section is prevented, and the trouble of the built-in RAM is removed. Consequently, execution of processing including the output comparison check can be re-started. Accordingly, the data processing apparatus is advantageous in that the reliability and the availability of the system are improved very much.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 1 is a block diagram illustrating an aspect of the present invention;

FIG. 7 is a time chart illustrating operation of the system control circuit shown in FIG. 6; and FIG. 8 is a flow chart illustrating operation of the data processing apparatus of FIG. 2.

DESCRIPTION OF THE PREFERRED EMBODIMENT

Figure 2:
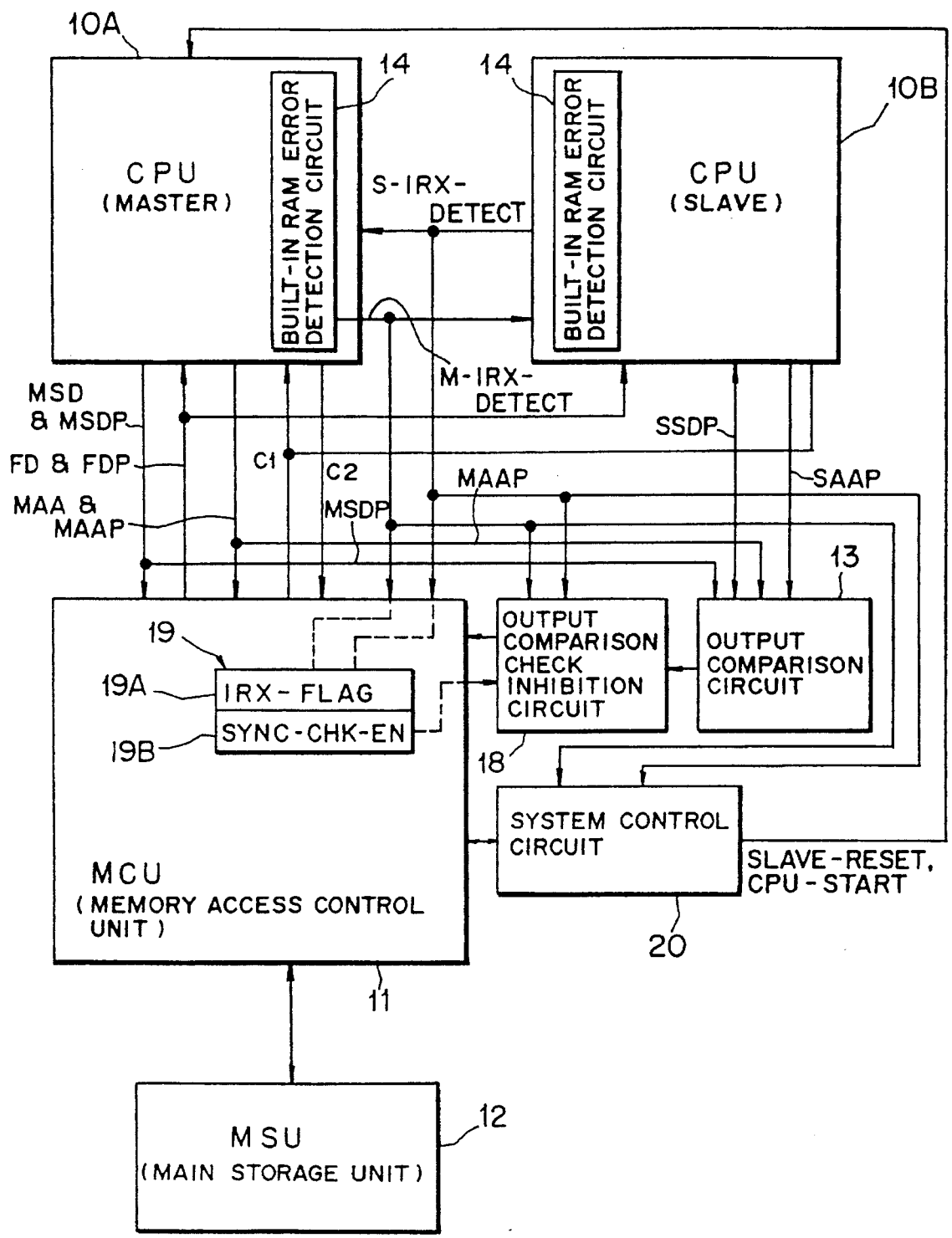
FIG. 2 is a block diagram of a data processing apparatus showing a preferred embodiment of the present invention.

Referring first to FIG. 1, there is shown a data processing apparatus according to an aspect of the present invention. The data processing apparatus includes a plurality of (at least two) multiple processing sections 1, a comparison section 2 for comparing the outputs of the processing sections 1 with each other, and a control section 3 which controls the processing sections 1 to perform a same operation, executes necessary processing while confirming based on a result of comparison by the comparison section 2 that the processing sections 1 are performing the same operation, and controls the processing sections 1 to stop their processing when incoincidence of the outputs of the processing sections 1 is confirmed based on the result of comparison by the comparison section 2.

Each of the processing sections 1 includes a built-in RAM 1a and a built-in RAM error detection section 4 for detecting that an error has occurred in the built-in RAM 1a. The data processing apparatus further includes an inhibition section 5 which inhibits, when the built-in RAM error detection section 4 detects that a built-in RAM error has occurred in at least one of the processing sections 1, a result of comparison output from the comparison section 2 originating from occurrence of the built-in RAM error.

When a result of comparison from the comparison section 2 is inhibited by the inhibition section 5, recovery processing against the built-in RAM error is performed, and then, the data processing apparatus executes processing including comparison of the outputs of the processing sections 1 by the comparison section 2.

The inhibition section 5 can be constituted from a logical OR gate and a logical AND gate as hereinafter described. Here, the logical OR gate logically provides an OR function to built-in RAM error detection signals output from the processing sections 1 and outputs a result of the logical OR function as a comparison inhibition signal. The logical AND gate logically provides an AND function to a result of comparison output from the comparison section 2 (at the same time as the built-in RAM error detection signals are output) and an inverted signal of the comparison inhibition signal from the logical OR gate, and outputs a result of the logical AND function as an output comparison error signal.

The control section 3 controls, based on information from one of the processing sections 1 determined in advance as a master processing unit, the processing sections 1 so as to perform recovery processing against built-in RAM error.

In this instance, the data processing apparatus may additionally include a resetting section for resetting any other processing section determined as a slave processing section than the master processing unit when a built-in RAM error is detected, and may further include a flag indicative of whether or not reset processing by the resetting section originates from a built-in RAM error. It is to be noted that, in place of provision of such flag, the control section 3 may request, upon detection of a built-in RAM error, the slave processing unit or units for interruption using as an interruption address an address for exclusive use for occurrence of a built-in RAM error.

Further, the control section 3 re-starts the master processing unit and the slave processing unit or units simultaneously after it confirms stoppage of the master and slave processing units so as to start recovery processing against the built-in RAM error.

As such recovery processing against a built-in RAM error, data saving processing and data writing processing which will be hereinafter described may be performed. Here, during the data saving processing, data in a built-in control register and a built-in status register of the master processing unit are saved once into a main storage section, and in the data writing processing, after the data saving processing, the data saved in the main storage section are written into a built-in control resister and a built-in status register of the slave processing unit or each of the slave processing units other than the master processing unit. Upon such data writing processing, the data saved in the main storage section may otherwise be written into the master processing unit and the slave processing unit or units simultaneously.

Further, upon recovery processing against a built-in RAM error, those of the built-in RAMs 1a which are each used as a translation lookaside buffer or a cache memory are invalidated by the master processing unit and the slave processing unit or units. Such recovery processing against a built-in RAM error is performed on the firmware on the upstream side of the OS (Operating System).

In the data processing apparatus according to the aspect of the present invention described above, if the built-in RAM error detection section 4 detects that a built-in RAM error has occurred in at least one of the processing sections 1, then the inhibition section 5 inhibits a result of comparison output from the comparison section 2 originating from the occurrence of the built-in RAM error. Consequently, when a built-in RAM error occurs, the system can be prevented from being stopped by the control section 3 in response to an output comparison check (synchronism check) of the comparison section 2.

Then, in the condition wherein the result of comparison from the comparison section 2 is inhibited by the inhibition section 5 to prevent stoppage of the system, recovery processing against the built-in RAM error is performed by the processing sections 1, whereafter processing which is executed including an output comparison check (synchronism check) of the comparison section 2 is resumed. Consequently, the trouble of the built-in RAM 1a of the processing section 1 can be removed without causing stoppage of the system.

It is to be noted that, where the inhibition section 5 is constituted from a logical OR gate and a logical AND gate as described above, when occurrence of a built-in RAM error is detected by the built-in RAM error detection section 4, the built-in RAM error detection signal from the built-in RAM error detection section 4 changes from "0" to "1" and the comparison inhibition signal from the logical OR gate changes from "0" to "1". When the comparison inhibition signal changes to "1" in this manner, an inverted signal of the inhibition signal is inputted with a value of "0" to the logical AND gate.

Consequently, the result of comparison from the comparison section 2 at the same time as the built-in RAM error detection signal input to the logical AND gate cannot pass the logical AND gate. As a result, outputting of the output comparison error signal is inhibited. In contrast, when the comparison inhibition signal from the logical OR gate is "0", since the inverted signal of the comparison inhibition signal is "1", the result of comparison from the comparison section 2 inputted to the logical AND gate is output as an output comparison error signal from the logical AND gate.

The recovery processing by the control section 3 against a built-in RAM error is performed based on information from the master processing unit from among the plurality of processing sections 1, and since the control section 3 makes information in the slave processing unit or units other than the master processing unit coincide with information in the master processing unit, the data processing apparatus can execute the same recovery processing software with the multiple processing units thereof to perform recovery processing.

In this instance, where the slave processing unit or units are reset, when a built-in RAM error is detected, by the resetting section and thereafter output a throw-off load accessing output, the slave processing unit or units need not wait until completion of such throw-off load accessing.

Further, where the control section 3 includes a flag indicative of whether or not reset processing by the resetting section originates from a built-in RAM error, it can be discriminated only by referring to the flag whether the reset processing by the resetting section is original reset processing such as a reset processing upon initialization of the system or resetting processing originating from a built-in RAM error. Consequently, a countermeasure corresponding to the type of reset processing (that is, when the resetting processing by the reset section is resetting processing which originates from a built-in RAM error, predetermined recovery processing) can be taken.

Where, in place of the flag described above, the address for exclusive use for occurrence of a built-in RAM error is used as the interruption address for interruption processing to the slave processing section or sections by the control section 3 upon detection of a built-in RAM error, it can be discriminated, similarly to the case wherein the flag is used, whether the reset processing by the resetting section is original reset processing such as resetting processing upon initialization of the system or reset processing which originates from a built-in RAM error, and consequently, a countermeasure corresponding to the type of the reset processing can be taken.

Further, the control section 3 re-starts the master processing unit and the slave processing unit or units simultaneously to start recovery processing after it confirms stoppage of the master and slave processing units. Thus, recovery processing against the built-in RAM error is performed without dividing recovery processing into recovery processing for the master processing unit, recovery processing for the slave processing unit or units and recovery processing for both of the master and slave processing units.

Then, data in the built-in control register and the built-in status register of the master processing unit are saved once into the main storage section, and then, the data thus saved in the main storage section are written into the built-in control resister and the built-in status register of the slave processing unit or each of the slave processing units other than the master processing unit so that the data of the built-in RAMs of the master and slave processing units may coincide with each other. Or otherwise if the data saved in the main storage section are written, upon data writing processing, into the master processing unit and the slave processing unit or units simultaneously, then the data in the built-in RAMs of the master and slave processing units can be made to coincide with each other. Particularly, in this instance, the necessity for separate control for the master processing unit and the slave processing unit or units is eliminated.

Further, data of those of the built-in RAMs which are each used as a translation lookaside buffer or a cache memory upon recovery processing against a built-in RAM error can be made to coincide with each other by invalidating the built-in RAMs in the master processing unit and the slave processing unit or units.

Further, where recovery processing against a built-in RAM error is performed on the firmware on the upstream side of the OS, the recovery processing against the built-in RAM error can be performed without any modification to the OS.

As described above, with the data processing apparatus according to the aspect of the present invention, when a built-in RAM error occurs, the system is prevented from being stopped in response to an output comparison check by the comparison section 2 and the trouble of the built-in RAM 1a can be removed to resume execution of processing including such output comparison check. Accordingly, the data processing apparatus is advantageous in that the reliability and the availability of the system are improved very much.

Where the inhibition section 5 has the simple construction constituted from a logical OR gate and a logical AND gate, a result of comparison by the comparison section 2 at the same time as a built-in RAM error detection signal can be inhibited readily and with certainty.

Further, recovery processing against a built-in RAM error can be performed very readily by making information in the slave processing unit or units coincide with information in the master processing unit based on the information in the master processing unit.

In this instance, even if the slave processing unit or units are outputting a throw-off load access output, resetting processing eliminates the necessity for the slave processing unit or units to wait for completion of throw-off load accessing. Consequently, recovery processing can be started immediately and with certainty.

Further, whether reset processing is original reset processing such as reset processing upon initialization of the system or reset processing which originates from a built-in RAM error can be discriminated readily by using a flag or an interruption address for exclusive use for detection of a built-in RAM error. Consequently, countermeasure corresponding to the type of the reset processing can be performed, and the reliability of the system can be further improved.

Further, since recovery processing against built-in RAM error is performed simultaneously for the master processing unit and the slave processing unit or units without dividing recovery processing into recovery processing for the master processing unit, recovery processing for the slave processing unit or units and recovery processing for both of the master and slave processing units, the necessity for separate control for the master processing unit and the slave processing unit or units is eliminated and control for the recovery processing can be performed readily with certainty.

Further, data in all of the master and slave processing units can be made to coincide with each other only by invalidating data in those of the built-in RAMs which are used each as a translation lookaside buffer or a cache memory. Consequently, recovery processing against a built-in RAM error can be simplified.

Further, where recovery processing against a built-in RAM error is performed on the firmware, the data processing apparatus according to the aspect of the present invention can be realized without any modification to the OS, and recovery processing against a built-in RAM error can be performed readily and with certainty.

Referring now to FIG. 2, there is shown in block diagram form a data processing apparatus according to a preferred embodiment of the present invention. In the present embodiment, the data processing apparatus includes dual CPUs.

In particular, the data processing apparatus includes a master CPU (main processing unit) 10A, a slave CPU (slave processing unit) 10B, a MCU (Memory access Control Unit; control section) 11, and a MSU (Main Storage Unit; main storage section) 12. The dual CPUs 10A and 10B execute a same operation under the control of the MCU 11.

The MCU 11 is interposed between the CPUs 10A and 10B and the MSU 12 and controls communication (read/write) of data with the MSU 12 in response to an access from any of the CPUs 10A and 10B.

In the present embodiment, store data MSD and a parity MSDP of the store data MSD, an access address MAA and a parity MAAP of the access address MAA, and a control signal C2 are sent from the master CPU 10A to the MCU 11. On the other hand, fetch data FD and a parity FDP of the fetch data FD, and a control signal C1 are sent from the MCU 11 to the master CPU 10A. Meanwhile, data, an address, a control signal and so forth are not sent from the slave CPU 10B to the MCU 11, but only a parity signal is sent from the slave CPU 10B to the MCU 11 in order to allow confirmation whether or not the dual CPUs 10A and 10B are performing a same operation. On the other hand, the fetch data FD and the parity FDP of the fetch data FD and the control signal C1 are sent from the MCU 11 to the slave CPU 10B similarly to the master CPU 10A.

In other words, only the control signal C2 and the access information from the master CPU 10A are inputted to the MCU 11, and only data MSD requested for accessing from the master CPU 10A and the parity MSDP of the data MSD are sent to the MSU 12. Meanwhile, the fetch data FD requested for fetching (reading) from the master CPU 10A and the parity FDP of the fetch data FD are read out from the MSU 12 and sent to both of the master CPU 10A and the slave CPU 10B.

Accordingly, since the same fetch data FD and control signal C1 are input to the master CPU 10A and the slave CPU 10B, the CPUs 10A and 10B execute the same operation, but accessing to the MCU 11 is performed only by the master CPU 10A.

It is to be noted, however, that, from the slave CPU 10B, only a store data parity SSDP and an access address parity SAAP are output, and they are input to an output comparison circuit 13 which will be hereinafter described. In particular, the slave CPU 10B is used to perform the same operation as that of the master CPU 10A to obtain data necessary for an output comparison check (synchronism check) which will be hereinafter described. It is to be noted that, in the description of the embodiment, the terminology "output comparison check" has the same significance as "synchronism check".

In this manner, in the present embodiment, a write signal line for access to the MCU 11 and so forth are eliminated for the slave CPU 10B. This reduces the amount of hardware which constitutes the system.

The data processing system shown in FIG. 2 further includes an output comparison circuit (comparison section) 13 which compares an output of the master CPU 10A and an output of the slave CPU 10B with each other to perform an output comparison check (synchronism check). In the present embodiment, the output comparison circuit 13 compares a stored data parity MSDP from the master CPU 10A and a store data parity SSDP from the slave CPU 10B with each other and simultaneously compares an access address parity MAAP from the master CPU 10A and an access address parity SAAP from the slave CPU 10B with each other, and outputs a synchronism check result SYNC-CHK as an output comparison error signal which changes from "0" to "1" when non-coincidence is detected in one of the comparisons.

It is to be noted that, while, in the present embodiment, only comparison between parities is performed in order to simplify the construction, comparison between stored data or between access addresses may otherwise be performed. A detailed construction of the output comparison circuit 13 will be hereinafter described with reference to FIG. 4.

The data processing apparatus further includes a status register 19 provided in the MCU 11 which can be accessed from the master CPU 10A. The status register 19 has an area 19A which will be hereinafter described and a synchronism check enable setting area (SYNC-CHK-EN) 19B for validating/invalidating a synchronism check by the output comparison circuit 13. When a "1" to enable a synchronism check is set in the area 19B, a synchronism check is valid so that, as hereinafter described with reference to FIG. 4, a synchronism check result SYNC-CHK from the output comparison circuit 13 is validated by an output comparison check inhibition circuit 18, which will be hereinafter described, and is input to the MCU 11.

Thus, the MCU 11 executes its processing while confirming based on the synchronism check result SYNC-CHK that the CPUs 10A and 10B are performing the same operation. However, when non-coincidence between the outputs of the CPUs 10A and 10B is confirmed based on the synchronism check result SYNC-CHK, the MCU 11 controls the data processing apparatus to stop its operation (stopping of the system).

Figure 4:
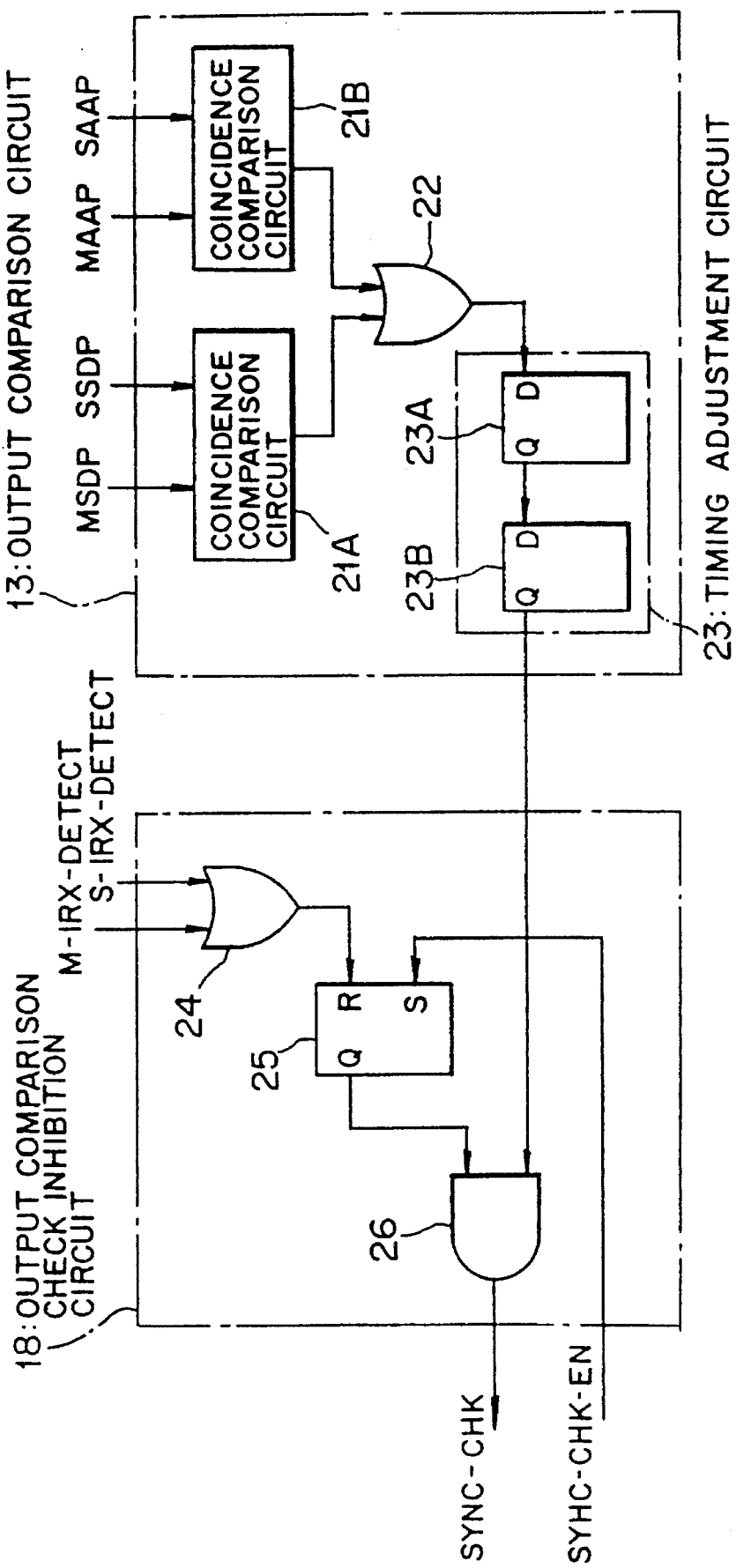
FIG. 4 is a block diagram showing a construction of an output comparison circuit and an output comparison check inhibition circuit in the data processing apparatus of FIG. 2.

When a "0" to disable a synchronism check is set in the area 19B described above, a synchronism check is invalid so that, as hereinafter described with reference to FIG. 4, a synchronism check result SYNC-CHK from the output comparison circuit 13 is invalidated by the output comparison check inhibition circuit 18 and is not input to the MCU 11. Consequently, the system is stopped in response to non-coincidence between the outputs of the CPUs 10A and 10B.

Each of the CPUs 10A and 10B in the present embodiment includes a built-in RAM error detection circuit 14 for detecting that an error has occurred in a built-in RAM of the CPU 10A or 10B. Each of the CPUs 10A and 10B includes a cache memory 15A and a TLB 15B as such built-in RAMs as shown in FIG. 3.

Figure 3:
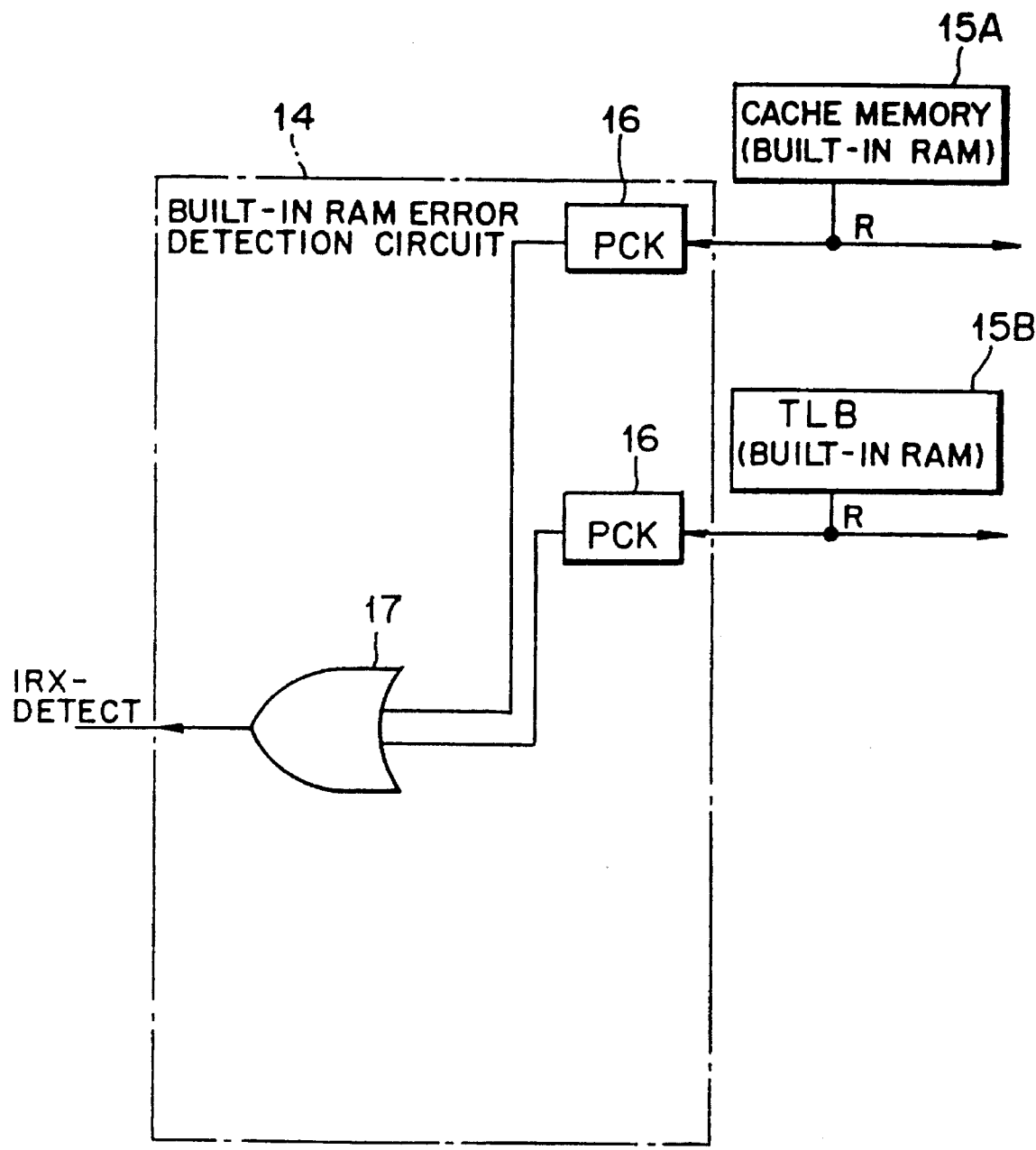
FIG. 3 is a block diagram showing a construction of a built-in RAM error detection circuit in the data processing apparatus of FIG. 2.

The built-in RAM error detection circuit 14 detects that an error (trouble of a bit inversion error or the like) has occurred in the built-in RAM 15A or 15B and includes, for example, as shown in FIG. 3, a plurality of (two are shown in FIG. 3) parity check circuits (PCK) 16 and a logical OR gate 17.

Each of the parity check circuits 16 is connected to a read port R of a corresponding one of the built-in RAMs 15A and 15B, and checks a parity of data read out from the read port R and outputs a parity check signal which changes from "0" to "1" when a parity error occurs (when a built-in RAM error occurs).

The logical OR gate 17 logically provides an OR function to parity check signals from the parity check circuits 16 and outputs a result of the logical OR function as a built-in RAM error detection signal IRX-DETECT. In particular, if a built-in RAM error occurs with any one of the built-in RAMs of the CPUs 10A and 10B, the built-in RAM error detection signal IRX-DETECT from the corresponding built-in RAM error detection circuit 14 changes from "0" to "1". The built-in RAM error detection signal IRX-DETECT is outputted from an external terminal provided for each of the CPUs 10A and 10B to the other slave CPU 10B or 10A and also to the MCU 11, the output comparison check inhibition circuit 18 and a system control circuit 20 which will be hereinafter described.

Referring back to FIG. 2, the built-in RAM error signal from the master CPU 10A is denoted at "M-IRX-DETECT" while the built-in RAM signal from the slave CPU 10B is denoted at "S-IRX-DETECT". Here, "IRX" is an abbreviation of "Internal RAM Exception".

The status register 19 of the MCU 11 further includes a built-in RAM error detection flag setting area (IRX-FLAG) 19A for setting a flag. The flag in the area 19A is set to "1" when any one of the built-in RAM error detection signal M-IRX-DETECT from the master CPU 10A and the built-in RAM error detection signal S-IRX-DETECT from the slave CPU 10B changes to "1". Accordingly, the software for controlling the system of the present embodiment is so constructed as to refer to the flag in the area 19A of the status register 19 to discriminate, when reset processing (which will be hereinafter described) for the slave CPU 10B is to be performed, whether the reset processing is original resetting processing such as reset processing upon initialization of the system or the like or reset processing which originates from a built-in RAM error.

Meanwhile, the output comparison check inhibition circuit 18 mentioned hereinabove inhibits, when a built-in RAM error occurs in at least one of the CPUs 10A and 10B, a result of comparison (synchronism check result SYNC-CHK) output from the output comparison circuit 13 originating from a occurrence of the built-in RAM error.

In the following, detailed constructions of the output comparison circuit 13 and the output comparison check inhibition circuit 18 will be described with reference to FIG. 4.

The output comparison circuit 13 includes a pair of coincidence comparison circuits 21A and 21B, a logical OR gate 22 and a timing adjustment circuit 23.

The coincidence comparison circuit 21A compares a store data parity MSDP from the master CPU 10A and a store data parity SSDP from the slave CPU 10B with each other and outputs a signal which changes from "0" to "1" when it detects non-coincidence between them. Similarly, the coincidence comparison circuit 21B compares an access address parity MAAP from the master CPU 10A and an access address parity SAAP from the slave CPU 10B with each other and outputs a signal which changes from "0" to "1" when it detects non-coincidence between them.

The logical OR gate 22 logically provides an OR function to signals from the coincidence comparison circuits 21A and 21B. Accordingly, a signal from the logical OR gate 22, that is, a synchronism check result SYNC-CHK, changes from "0" to "1" when non-coincidence of a parity (non-coincidence between the outputs of the CPUs) is detected by at least one of the coincidence comparison circuits 21A and 21B.

The timing adjustment circuit 23 includes a pair of registers (D-type flip-flops) 23A and 23B disposed at two successive stages. The registers 23A and 23B delay a synchronism check result SYNC-CHK from the logical OR gate 22 by a period corresponding to, in the present embodiment, two cycles to adjust the timing of output of the synchronism check result SYNC-CHK.

The adjustment of the output timing is performed by the following reason. In particular, when a built-in RAM error occurs, this is detected by the built-in RAM error detection circuit 14 and also the synchronism check result SYNC-CHK from the logical OR gate 22 simultaneously changes from "0" to "1". However, a delay of two cycles is involved in the present embodiment after the built-in RAM error occurs until the synchronism check result SYNC-CHK is actually inhibited by the output comparison check inhibition circuit 18 (refer to FIG. 5). Therefore, the outputting timing of the synchronism check result SYNC-CHK to be inhibited by the output comparison check inhibition circuit 18 is adjusted by the timing adjustment circuit 23 so that the synchronism check result SYNC-CHK may be originated from the built-in RAM error.

Meanwhile, the output comparison check inhibition circuit 18 includes a logical OR gate 24, a synchronous SR-type flip-flop 25, and a logical AND gate 26.

The logical OR gate 24 logically ORs the built-in RAM error detection signal M-IRX-DETECT from the master CPU 10A and the built-in RAM error detection signal S-IRX-DETECT from the slave CPU 10B and outputs result of the logical OR function as a comparison inhibition signal which changes to "1" if a built-in RAM error occurs with any one of the CPUs 10A and 10B.

The SR-type flip-flop 25 receives, at an R terminal thereof, a comparison inhibition signal from the logical OR gate 24 and receives, at an S terminal thereof, a synchronism check enable signal SYNC-CHK-EN from the status register 19 of the MCU 11. An output from a Q terminal of the SR-type flip-flop 25 exhibits, when the synchronism check enable signal SYNC-CHK-EN is "1", "1" as far as the comparison inhibition signal from the logical OR gate 24 remains "0", but if the comparison inhibition signal changes to "1", then the output from the Q terminal of the SR-type flip-flop 25 changes to "0". In other words, it can be considered that, from the Q terminal of the SR-type flip-flop an inverted signal of the comparison inhibition signal from the logical OR gate 24 is output when the synchronism check enable signal SYNC-CHK-EN is "1".

The logical AND gate 26 logically ANDs the synchronism check result SYNC-CHK output from the output comparison circuit 13 at the same time as the built-in RAM error detection signal and the output of the Q terminal of the SR-type flip-flop 25 and outputs a result of the logical AND function as a synchronism check result SYNC-CHK (output comparison error signal).

When the synchronism check enable signal SYNC-CHK-EN is "0" and consequently a synchronism check is invalid, the output of the logical AND gate 26 always exhibits "0" since the output of the Q terminal of the SR-type flip-flop 25 is "0", and consequently, a synchronism check result SYNC-CHK from the output comparison circuit 13 is invalidated. However, when the synchronism check enable signal SYNC-CHK-EN is "1" and accordingly a synchronism check is valid, since the output of the Q terminal of the SR-type flip-flop 25 is "1", the synchronism check result SYNC-CHK from the output comparison circuit 13 is allowed to pass the logical AND gate 26, that is, validated.

If, in the condition wherein a synchronism check is valid, a built-in RAM error occurs with any one of the CPUs 10A and 10B and the comparison inhibition signal from the logical OR gate 24 changes to "1", then the output of the Q terminal of the SR-type flip-flop 25 is changed over to "0", and consequently, the synchronism check result SYNC-CHK from the output comparison circuit 13 is inhibited from passing the logical AND gate 26, that is, invalidated.

Accordingly, in the present embodiment, even if the system is in a condition wherein a synchronism check is valid in accordance with the synchronism check enable signal SYNC-CHK-EN, if a built-in RAM error occurs with any one of the CPUs 10A and 10B, the synchronism check result SYNC-CHK from the output comparison circuit 13 is invalidated, thereby entering another condition wherein a synchronous check is substantially invalid. Consequently, the system is prevented from being stopped by the built-in RAM error.

It is to be noted that, although the clock terminals (CLK) of the registers 23A and 23B and the SR-type flip-flop 25 are omitted, a clock signal is inputted actually to the flip-flops 23A, 23B and 25 so that they operate in synchronism with the clock signal.

Figure 5:
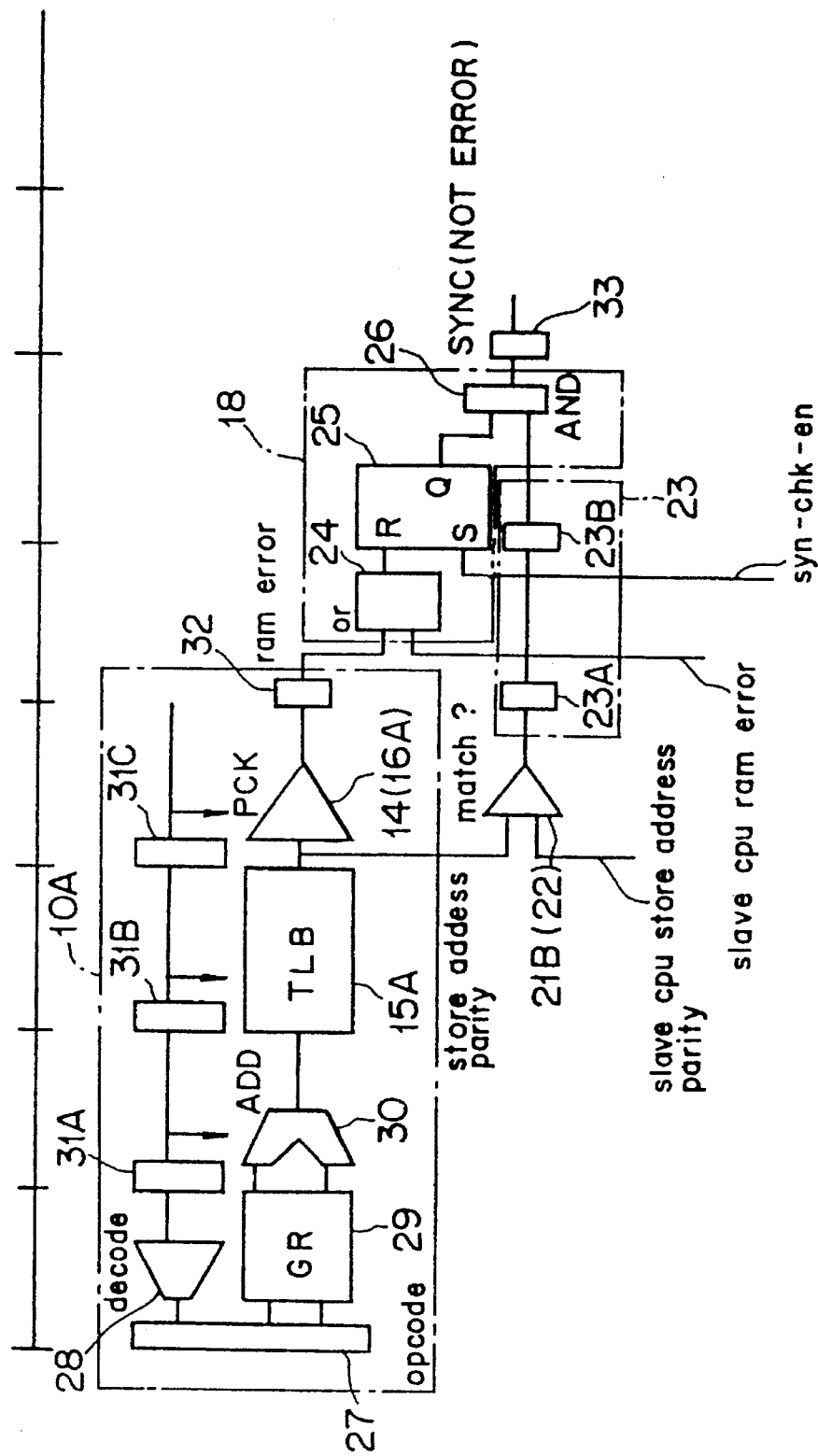
FIG. 5 is a time chart illustrating operation of the output comparison circuit and the output comparison check inhibition circuit and showing components of the circuits which perform individual processes in a corresponding relationship to the processing timings.

Subsequently, operation of the output comparison circuit 13 and the output comparison check inhibition circuit 18, constructed in such a manner as described above, will be described briefly with reference to FIG. 5. It is to be noted that, in FIG. 5, reference numeral 27 denotes an instruction code register, 28 a decoder, 29 a general purpose register (GR), 30 an adder (ADD), and reference characters 31A to 31C, 32 and 33 denote each a register.

If an instruction code (opcode) is input to the instruction code register 27 of the master CPU 10A, then this is decoded (decode) by the decoder 28, and data necessary for calculation are read out from the general purpose register 29. Results of the decoding by the decoder 28 are successively stored into the registers 31A, 31B and 31C for each processing cycle, and in each processing cycle, processing based on the result of decode is executed.

After the decoding processing of the instruction code, address calculation processing by the adder 30 is performed in accordance with the result of decoding, and a result of the address calculation is converted into an address by the cache memory (built-in RAM) 15B.

Then, upon such address conversion, a parity check of data (access address and so forth) read out from the TLB 15B is performed by a parity check circuit 16 of the built-in RAM error detection circuit 14.

The operation described above is performed quite similarly also by the slave CPU 10B not shown, and simultaneously with such parity checks, the access address parity MAAP from the master CPU 10A and the access address parity SAAP from the slave CPU 10B obtained upon the address conversion are input to the coincidence comparison circuit 21B of the output comparison circuit 13 so that a coincidence (match) check between the parities is performed by the coincidence comparison circuit 21B.

The results of the parity checks by the parity check circuits 16 are stored once into the register 32 and then input as built-in RAM error detection signals M-IRX-DETECT and S-IRX-DETECT to the logical OR gate 24 of the output comparison check inhibition circuit 18, and a result of a logical OR function by the logical OR gate 24 is inputted as a comparison inhibition signal to the R terminal of the SR-type flip-flop 25. Then, the output of the Q terminal of the SR-type flip-flop 25 and the synchronism check result SYNC-CHK from the output comparison circuit 13 are logically provided with an AND function by the logical AND gate 26, and a result of the logical AND function is output as a synchronism check result SYNC-CHK from the logical AND gate 26.

In this instance, as described above, since the synchronism check result SYNC-CHK from the output comparison circuit 13 is delayed by an operation period of the logical OR gate 24 and SR-type flip-flop 25 by the registers 23A and 23B of the timing adjustment circuit 23, the synchronism check result SYNC-CHK originating from the built-in RAM error is inhibited.

By the way, the data processing apparatus shown in FIG. 2 further includes a system control circuit (resetting section) 20. The system control circuit 20 has a function as a resetting section for outputting a slave reset signal (SLAVE-RESET) to reset the slave CPU 10B when a built-in RAM error is detected and also has another function of outputting a re-start signal (CPU-START) in order to re-start the CPUs 10A and 10B simultaneously to start recovery processing against the built-in RAM error after stopping of the CPUs 10A and 10B is confirmed.

Figure 6:
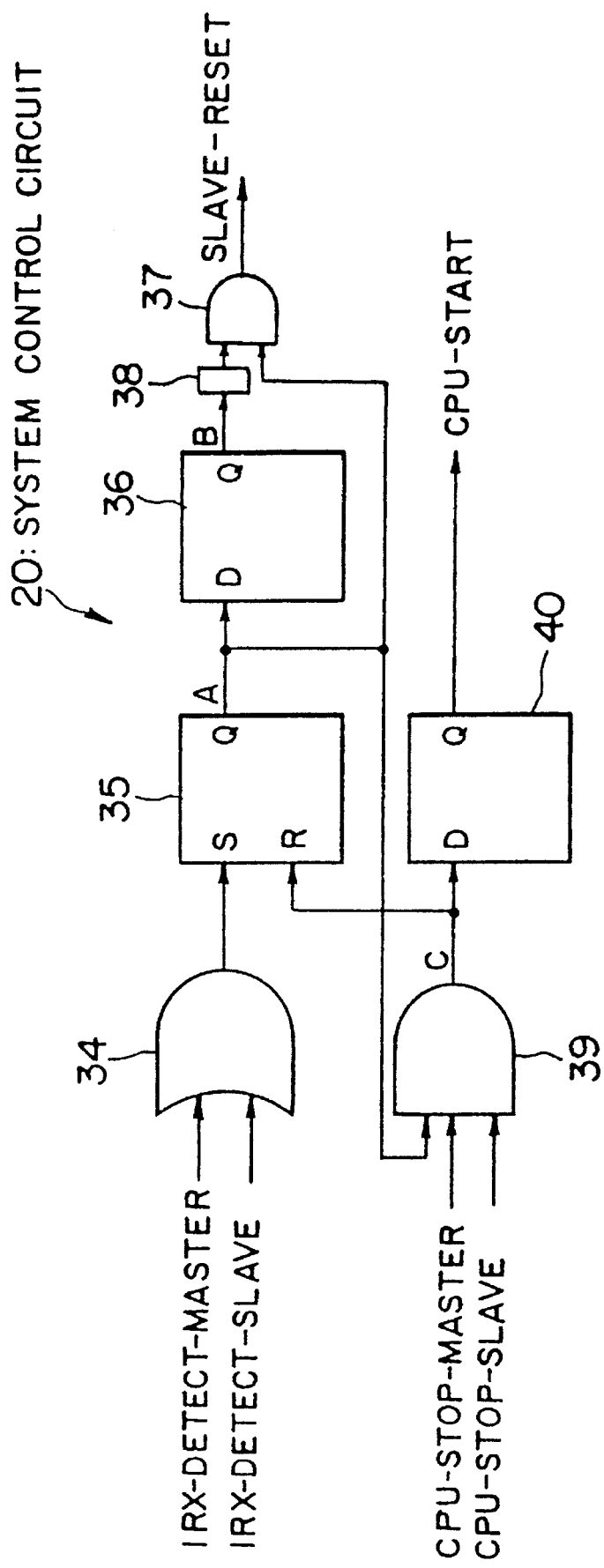
FIG. 6 is a block diagram showing a construction of a system control circuit of the data processing apparatus of FIG. 2.

Referring now to FIG. 6, the system control circuit 20 includes a logical OR gate 34, a synchronous SR-type flip-flop 35, a D-type flip-flop (register) 36, a logical AND gate 37, an inverter circuit 38, a logical AND gate 39 and a D-type flip-flop (register) 40. It is to be noted that, although the clock terminals (CLK) of the SR-type flip-flop 35 and the D-type flip-flops 36 and 40 are omitted in FIG. 6, the clock signal is actually input to the flip-flops 35, 36 and 40 so that they all operate in synchronism with the clock signal.

The logical OR gate 34 logically provides an OR function to the built-in RAM error detection signal M-IRX-DETECT (IRX-DETECT-MASTER in FIG. 6) from the master CPU 10A and the built-in RAM error detection signal S-IRX-DETECT (IRX-DETECT-SLAVE in FIG. 6) from the slave CPU 10B. The output of the logical OR gate 34 exhibits "1" when a built-in RAM error occurs in any one of the CPUs 10A and 10B, similarly to the comparison inhibition signal from the logical OR gate 24.

The SR-type flip-flop 35 receives, at the S terminal thereof, the output of the logical OR gate 34 and receives, at the R terminal thereof, the output (refer to reference character C in FIGS. 6 and 7) of the logical AND gate 39.

The D-type flip-flop 36 receives, at the D terminal thereof, the output of the Q terminal of the SR-type flip-flop 35 (refer to reference character A in FIGS. 6 and 7) and outputs the Q terminal output of the SR-type flip-flop 35 delaying it by one clock interval (refer to reference character B in FIGS. 6 and 7).

The logical AND gate 37 receives the Q terminal output of the D-type flip-flop 36 by way of the inverter circuit 38, logically provides an OR function to an inverted signal of the Q output terminal of the D-type flip-flop 36 and the output of the Q terminal of the SR-type flip-flop 35 and outputs a result of the logical AND function as a slave resetting signal (SLAVE-RESET).

The logical AND gate 39 logically ANDs the Q terminal output of the SR-type flip-flop 35, a stopping signal (CPU-STOP-MASTER) of the master CPU 10A and a stopping signal (CPU-STOP-SLAVE) of the slave CPU 10B and outputs a result of the logical ANDing. The output of the logical AND gate 39 (refer to reference character C in FIGS. 6 and 7) changes to "1" when both of the CPUs 10A and 10B stop (when the two stopping signals change to "1") after the Q terminal output of the SR-type flip-flop 35 changes to "1" (that is, after the built-in RAM error occurs).

The D-type flip-flop 40 receives, at the D terminal thereof, the output of the logical AND gate 39 and holds it for one clock period, and outputs the held output as a re-start signal (CPU-START) to the CPUs 10A and 10B from the Q terminal thereof.

Subsequently, operation of the system control circuit 20, constructed in such a manner as described above will be described briefly with reference to FIG. 7. FIG. 7 illustrates the operation when a built-in RAM error occurs in, for example, the master CPU 10A, that is, the built-in RAM error detection signal IRX-DETECT-MASTER (output of the logical OR gate 34) changes to "1" at a time $t_1$.

At a time $t_2$ of a first rising edge of the clock signal CLK after the output of the logical OR gate 34 changes to "1", the output of the logical OR gate 34 is fetched into the SR-type flip-flop 35 from the S terminal, whereupon the Q terminal output A of the SR-type flip-flop 35 changes to "1". At this point of time, the Q terminal output B of the D-type flip-flop 36 is "0", and the signal inputted to the logical AND gate 37 by way of the inverter circuit 38 is "1". Consequently, when the Q terminal output A of the SR-type flip-flop 35 which is the other signal input to the logical AND gate 37 changes to "1", the output of the logical AND gate 37, that is, the slave resetting signal, changes to "1". Consequently, reset processing for the slave CPU 10B is performed.

Then at a time $t_3$ of a next rising edge of the clock signal CLK, the Q output terminal A of the SR-type flip-flop 35 is fetched into the D-type flip-flop 36 from the D terminal, whereupon the Q terminal output B of the D-type flip-flop 36 changes to "1". Consequently, the signal input to the logical AND gate 37 by way of the inverter circuit 38 changes to "0", and the slave resetting signal from the logical AND gate 37 changes to "0". Accordingly, the slave resetting signal exhibits "1" only within the period for one clock interval.

In response to the occurrence of the built-in RAM error and the outputting of the slave resetting signal described above, the master CPU 10A is first stopped at a time $t_4$ so that the stopping signal of it changes to "1", and then at another time $t_5$, the slave CPU 10B is stopped so that the stopping signal of it changes to "1". As a result, since all of the three inputs to the logical AND gate 39 (that is, the Q terminal output A of the SR-type flip-flop 35 and the two stopping signals) now exhibit "1", the output C of the logical AND gate 39 changes to "1".

At a time $t_6$ of a first rising edge of the clock signal CLK after the output C of the logical AND gate 39 changes to "1", the output C of the logical AND gate 39 is fetched into the SR-type flip-flop 35 from the R terminal, whereupon the Q terminal output A of the SR-type flip-flop 35 changes to "0". Simultaneously, the output C of the logical AND gate 39 is fetched into the D-type flip-flop 40 from the D terminal. Consequently, the Q terminal output of the D-type flip-flop 40, that is, the re-start signal, exhibits "1" only within the period of one clock interval, and accordingly, re-starting processing for the CPUs 10A and 10B is performed.

Then, in response to the change of the Q output terminal A of the SR-type flip-flop 35 from "1" to "0", also the output C of the logical AND gate 39 changes to "0", and in response to the change of the re-start signal to "1", the stopping signals of the CPUs 10A and 10B change to "0". Further, at a time $t_7$ of a next rising edge of the clock signal CLK, the Q terminal output of the SR-type flip-flop 35 is fetched into the D-type flip-flop 36 from the D terminal, and consequently, also the Q terminal output B of the D-type flip-flop 36 changes to "0" again.

It is to be noted that the slave resetting signal (SLAVE-RESET) from the logical AND gate 37 and the re-start signal (CPU-START) from the D-type flip-flop 40 are logically provided with an OR function with an original CPU resetting signal and an original CPU start signal produced by the conventional function of the system control circuit 20, respectively, and are output as results of the logical OR function. Here, the original reset signal is output upon reset processing such as reset processing upon initialization or the like, and the original CPU start signal is output upon start processing upon building up of the system, or the like.

Referring back to FIG. 2, the MCU 11 in the present embodiment has a function of causing, when the synchronism check result SYNC-CHK from the output comparison circuit 13 is inhibited by the output comparison check inhibition circuit 18 as a result of occurrence of a built-in RAM error, processing by the CPUs 10A and 10B including a synchronism check to be executed after recovery processing against the built-in RAM error is performed in accordance with recovery processing software.

In this instance, after the CPUs 10A and 10B are stopped in response to occurrence of the built-in RAM error and the slave resetting signal from the output comparison check inhibition circuit 18, the CPUs 10A and 10B are re-started in response to a re-start signal from the output comparison check inhibition circuit 18 to re-establish a synchronized condition of the CPUs 10A and 10B, and thereafter, the MCU 11 performs recovery processing against the built-in RAM error based on information of the predetermined master CPU 10A (the CPU to which a signal line for stored information to the MSU 12 is provided from the MCU 11).

In particular, the MCU 11 in the present embodiment first performs, as recovery processing, data saving processing for saving data in a built-in control register and a built-in status register (not shown) including a program counter, an interruption cause register and so forth in the master CPU 10A once into the MSU 12, and then performs data write processing for writing the data saved in the MSU 12 simultaneously into the built-in control registers and the built-in status registers of the CPUs 10A and 10B. The data in the built-in control registers and the built-in status registers of the CPUs 10A and 10B are made to coincide with each other in this manner.

Upon such data write processing as described above, however, the data saved once in the MSU 12 may otherwise be written only into the built-in control register and the built-in status register of the slave CPU 10B. However, where the saved data are written into both of the CPUs 10A and 10B, there is an advantage in that the necessity for separate control of the master CPU 10A and the slave CPU 10B is eliminated and consequently control for recovery processing can be performed readily with certainty. It is to be noted that, after the data saving processing is performed, the processing including a synchronism check by the output comparison circuit 13 is re-started. To this end, writing into the synchronism check enable setting area 19B (SYNC-CHK-EN) of the status register 19 in the MCU 11 of FIG. 2 is performed to change the synchronism check enable signal SYNC-CHK-EN of FIG. 4 to "1," to change the input to the S terminal of the SR-type flip-flop 25 to "1," so as to change the synchronism check result SYNC-CHK to "1," to re-start a synchronism check.

Further, upon recovery processing against a built-in RAM error, contents of the cache memories 15A and TLBs 15B which are built-in RAMS of the CPUs 10A and 10B are erased into an invalid condition by the software in order to make the data in the cache memories 15A and TLBs 15B all coincide with each other between the CPUs 10A and 10B.

Then, where the recovery processing against a built-in RAM error by the MCU 11 described above is performed on the firmware on the upstream of the OS, such recovery processing can be realized without making any modification to the OS. Consequently, there is an advantage in that recovery processing against a built-in RAM error can be performed readily and with certainty.

It is to be noted that the recovery processing software (program) executed by the CPUs is provided in the MSU 12, and the software is executed simultaneously by the CPUs 10A and 10B. Further, the software can take, upon reset processing by the system control circuit 20, a countermeasure corresponding to the type of reset processing since it can refer to the flag (IRX-FLAG) in the area 19A of the status register 19 to discriminate whether or not the resetting processing is original reset processing such as reset processing upon initialization of the system or the like or reset processing which originates from a built-in RAM error.

In particular, if the flag in the area 19A of the status register 19 is "1" upon reset processing, then since the reset processing originates from a built-in RAM error, execution of the recovery processing software for recovering the built-in RAM error is started.

Instead of providing such a flag as described above in the status register 19, if the MCU 11 interrupts, when a built-in RAM error is detected, the slave CPU 10B using, as the interruption address then, the address for exclusive use for occurrence of a built-in RAM error, then similar advantages to those obtained where the flag is used can be achieved.

Subsequently, general operation of the data processing apparatus of the present embodiment which is constructed in such a manner as described above and has such various functions as described above will be described in accordance with a flow chart of FIG. 8 (steps S1 to S14) with reference to FIGS. 2 to 7. It is to be noted that, in FIG. 8, an example of operation when a built-in RAM error occurs in the master CPU 10A is illustrated.

First, if occurrence of a built-in RAM error is detected by the built-in RAM error detection circuit 14 of the master CPU (CPU(M)) 10A (step S1), then a detection signal M-SYNC-DETECT of it is notified to the MCU 11, the output comparison check inhibition circuit 18, the system control circuit 20 and the slave CPU 10B as seen in FIG. 2. Thereupon, the flag "IRX-FLAG" in the status register 19 (area 19A) of the MCU 11 is set to "1".

If a synchronism check is valid, then the output comparison check inhibition circuit 18 inhibits the synchronism check result SYNC-CHK from the output comparison circuit 13 to invalidate the synchronism check as described hereinabove with reference to FIGS. 4 and 5. Further, the system control circuit 20 outputs a slave resetting signal (SLAVE-RESET) to the slave CPU 10B so that slave CPU 10B is reset (step S2) as described hereinabove with reference to FIGS. 6 and 7.

Further, the master CPU 10A advances its control sequence to "restore-state (front half)" at step S3, at which it stops itself after it performs a waiting operation for completion of an asynchronous operation (throw-off load accessing or co-processor accessing). Meanwhile, the slave CPU 10B receives and is reset by the slave resetting signal, and then advances its control sequence to "restore-state (front half)" at step S4, at which it stops itself after it performs a waiting operation for completion of an asynchronous operation. Whether or not an asynchronous operation is involved can be discriminated, since a busy signal is communicated between the CPU and the co-processor, by monitoring the busy signal.

Here, the necessity for such reset processing of the slave CPU 10B as described above at step S2 will be described.

In the data processing apparatus of the present embodiment, when a built-in RAM error occurs, if the master CPU 10A is performing throw-off load accessing or co-processor accessing, then completion of the accessing must be waited. A displacement (slip) of several cycles is produced after the built-in RAM error occurs in the master CPU 10A until the slave CPU 10B stops. There is the possibility that the slave CPU 10B may issue a next instruction within the displacement.

If the slave CPU 10B issues, within the displacement, an accessing instruction to the outside of the CPU such as a loading instruction, then even if the slave CPU 10B is thereafter instructed to stop itself, it does not enter a stop condition until it completes the instruction. In this instance, since the slave CPU 10B accepts the stop request after issuance of the instruction, it waits for completion of the instruction.

Since the data processing apparatus of the present embodiment is constructed, as seen from FIG. 2, so as not to accept any request from the slave CPU 10B to the outside, a loading instruction output from the slave CPU 10B before stopping is ignored by the MCU 11 and the request will not be accepted at all, and consequently, the slave CPU 10B will enter an endless loop in a condition wherein it waits for completion of an asynchronous operation.

Since such a situation as described above may possibly occur, in the present embodiment, when a built-in RAM error occurs, the system control circuit 20 generates a slave reset signal to perform reset processing for the slave CPU 10B.

Accordingly, even if the slave CPU 10B is outputting a throw-off loading accessing signal when a built-in RAM error occurs, the slave CPU 10B does not wait for completion of the throw-off loading accessing as a result of reset processing, and consequently, the slave CPU 10B can be prevented from entering an endless loop condition and can perform recovery processing immediately and with certainty.

It is to be noted that, where the CPU does not perform throw-off loading accessing, if stopping (interruption) occurs in response to a built-in RAM error, then it is only required to cancel an instruction, and accordingly, there is no necessity of generating such a slave resetting signal as described above by the system control circuit 20 and it is only required to generate a suitable interruption signal.

Subsequently, the reason why, when co-processor accessing is performed, completion of the instruction (completion of an asynchronous operation) must be waited at steps S3 and S4 will be described. Here, it is assumed that the co-processor is a VPU (Vector Processor Unit) and such instructions ① to ⑤ as given below are successively issued:

| | | | | |
|---|---|---|---|---|
| ① | vadd, | vr1, | vr2, | vr3 |
| ② | add | r1, | r2, | r3 |
| ③ | or | r3, | r4, | r5 |
| ④ | ld | r2, | r3, | r6 |
| ⑤ | sub | r1, | r2, | r3 | where ① represents an addition instruction to the VPU. It is assumed that a built-in RAM error occurs upon, for example, a loading instruction of ④. It is to be noted that vadd, add, or, ld and sub in ① to ⑤ represent different kinds of instructions, and vr1, vr2, vr3 and r1 to r6 represent numbers of registers into which data for processing of the individual instructions are stored.

Since such a vector instruction as in ① above involves a comparatively large number of data (for example, floating point addition of 1,024 pairs is performed), much processing time is required if an operation of a next instruction is started after waiting for completion of the vector instruction. Therefore, such a vector instruction is generally performed as an asynchronous operation, and the CPUs 10A and 10B successively execute the following instructions beginning with the next instruction ② taking that the co-processor instruction (vector instruction) ① has been completed.

However, if such a procedure that, when a built-in RAM error occurs at the instruction ④ although the co-processor instruction ① is not completed yet, recovery processing is started without waiting for completion of the co-processor instruction ① is adopted, then the non-completed co-processor instruction ① must be re-executed in the recovery operation. Further, since the instructions beginning with the instruction ② next to the co-processor instruction ① and ending with the instruction ③ prior to the instruction ④ at which the built-in RAM error occurs have been executed already by the CPUs 10A and 10B, such very much complicated control that those instructions must not be executed again is required. From such reason, stopping of the CPUs 10A and 10B is performed after waiting for completion of asynchronous processing.

Now, if both of the CPUs 10A and 10B are stopped by the processing at steps S3 and S4, then a re-starting signal (CPU-START) is outputted to the CPUs 10A and 10B so that the CPUs 10A and 10B are re-started simultaneously with each other as described hereinabove with reference to FIGS. 6 and 7 (step S5). For the period after the built-in RAM error occurs until the CPUs 10A and 10B are re-started simultaneously at step S5, a displacement in timing is produced between the two CPUs 10A and 10B. However, if the CPUs 10A and 10B are re-started simultaneously with each other at step S5, then the displacement in timing is eliminated although the stored data of the CPUs 10A and 10B remain different from each other up to step S9 which will be hereinafter described.

Then, after the re-starting, the master CPU 10A advances its control sequence to a "restore-state (rear half)" at step S6. In the "restore-state (rear half)", another program interruption may possibly occur simultaneously with occurrence of a built-in RAM error. In this instance, such another program instruction factor is set in a status register IRD (InterRuption Designation) in the inside of the CPU. In short, since this signifies that a plurality of interruptions has occurred, the priority between the interruptions is determined. In this instance, naturally the built-in RAM error is higher in priority. After the priority is determined, a PC (program counter), a PEV (Processing EnVironment; processing environment) and so forth are saved, and then the control sequence jumps to a new PC for a recovery operation.

Similarly, after the re-starting, also the slave CPU 10B advances its control sequence to "restore-state (rear half)" at step S7, at which similar processing to that of the master CPU 10A is performed. However, since no store data line is connected to the slave CPU 10B, the saved PC, PEV and so forth will not be used.

After the processing at steps S6 and S7 is completed, the MCU 11 saves data (internal conditions; for example, data of internal registers, a jump flag of a control system and so forth) of the built-in control register and the built-in status register of the master CPU 10A into the MSU 12 in accordance with the recovery processing software (step S8), and then instructs re-starting of a synchronism check (step S9). In response to the instruction, the inhibition condition by the output comparison check inhibition circuit 18 is cancelled, and a synchronism check by the output comparison circuit 13 returns to a valid condition (step S10).

Then, the information having been saved into the MSU 12, at step S8, is now written simultaneously into the built-in control registers and the built-in status registers of the CPUs 10A and 10B thereby to make the contents of data in the built-in control registers and the built-in status registers of the CPUs 10A and 10B coincide with each other (step S11).

In this instance, it is very cumbersome in a control operation to otherwise separate the recovery processing for the master CPU 10A, the recovery processing for the slave CPU 10B and the recovery processing for both of the CPUs 10A and 10B from one another and start and stop such recovery processing for the individual CPUs 10A and 10B. Therefore, in the present embodiment, the quite same recovery processing is performed simultaneously for the CPUs 10A and 10B as described above, and consequently, start-stop control of the CPUs 10A and 10B for recovery processing is performed readily and with certainty.

Further, at this stage, since the built-in RAM error has occurred, naturally the condition of the cache memory 15A or the TLB 15B which is a built-in RAM may possibly be different between the CPUs 10A and 10B (when a software error occurs, data can be read out correctly if such reading is attempted again). Therefore, in order to compel the conditions of the cache memories 15A and the TLBs 15B of the CPUs 10A and 10B to coincide with each other, in the present embodiment, contents of all of the cache memories 15A and the TLBs 15B of the CPUs 10A and 10B are erased to invalidate them (step S12).

If the conditions of the cache memories 15A and the TLBs 15B remain non-coincident, then address conversion may occur with only one of the CPUs or move-in by a miss of the cache may occur. Consequently, the synchronism is lost, and the system is stopped as a result of a synchronism check by the output comparison circuit 13. Further, erasing invalidating processing at step S12 is naturally required in order to invalidate an entry of the built-in RAM in which the error has occurred.

By the processing described above, both of the CPUs 10A and 10B restore the same conditions of the internal registers and so forth as those when the master CPU 10P, stopped.

It is to be noted that, when writing into the interruption cause register is impossible, both of the CPUs 10A and 10B perform such interruption processing as IRX (InterRuption exception) in accordance with an interruption cause to the master CPU 10A saved in the MSU 12.

Further, in the present embodiment, since the instruction of the IRX has been completed and information necessary for re-execution such as an address and a size of accessing is stored in a LAX (Logical Access exception) which is one of the status registers in the CPU, emulation is performed using the information. Also when writing into the LAX register is impossible, interruption processing such as IRX is performed in accordance with the interruption cause of the master CPU 10A saved in the MSU 12. Further, execution of a succeeding loading instruction may possibly be inhibited as a result of a preceding built-in RAM error and this may be stored in the LAX register, and emulation is performed also in accordance with the loading instruction (step S13). It is to be noted that the order of the processes at steps S9 to S13 after saving of data (internal conditions) at step S8 is not limited to that illustrated in FIG. 8.

After the emulation is performed by such recovery processing as described above, the control sequence returns to the original program from which the interruption occurred as a result of the built-in RAM error (step S14).

While the recovery processing described above is performed in response to a built-in RAM error which occurs in the master CPU 10A, when a built-in RAM error occurs otherwise in the slave CPU 10B, recovery processing is performed in a substantially similar manner to that in the processing procedure illustrated in FIG. 8. In particular, if a built-in RAM error is detected by the built-in RAM error detection circuit 14 of the slave CPU 10B, then a detection signal S-SYNC-DETECT (representing this fact) is notified to the MCU 11, the output comparison check inhibition circuit 18, the system control circuit 20 and the master CPU 10A as seen from FIG. 2. Simultaneously, the restore state (restore-state) sequence by built-in RAM error interruption is started.

In this instance, the master CPU 10A receives the built-in RAM error detection signal S-SYNC-DETECT and enters its restore state (restore-state), in which it stops itself upon completion of an asynchronous operation.

Further, in response to the built-in RAM error detection signal S-SYNC-DETECT, a synchronism check result from the output comparison circuit 13 is inhibited by the output comparison check inhibition circuit 18, and simultaneously, a resetting signal is output from the system control circuit 20 to the slave CPU 10B.

The slave CPU 10B enters a restore state (restore-state) as a result of resetting interruption and enters a stop condition after waiting for completion of an asynchronous operation. The slave CPU 10B thereafter waits for a re-start signal from the system control circuit 20.

Then, the system control circuit 20 confirms that both of the CPUs 10A and 10B stop after slave resetting and re-activates, after such confirmation, both of the CPUs 10A and 10B so that the processing at steps S8 to S14 described above is executed by the CPUs 10A and 10B. Consequently, also when a built-in RAM error occurs in the slave CPU 10B, recovery processing is performed.

However, since the processing at step S13 is performed based on the LAX information of the master CPU 10A described above, even if a built-in RAM error occurs in the slave CPU 10B, operand accessing emulation is not necessarily performed.

In this manner, with the data processing apparatus of the embodiment of the present invention, when a built-in RAM error occurs, a synchronism check by the output comparison circuit 13 is inhibited and execution of processing including a synchronism check can be re-started after recovering the built-in RAM from the trouble while preventing stoppage of the system. Consequently, the data processing apparatus is advantageous in that the reliability and the availability of the system can be improved very much.

Further, with the data processing apparatus of the present embodiment, since the output comparison check inhibition circuit 18 of a simple construction including the logical OR gate 24, the logical AND gate 26 and so forth is employed, a result of a synchronism check at the same time as a built-in RAM error detection signal can be inhibited readily and with certainty.

Furthermore, with the data processing apparatus of the present embodiment, since the internal condition of the master CPU 10A is written into the CPUs 10A and 10B simultaneously and all of the cache memories 15A and the TLBs 15B are invalidated, the internal conditions of all of the internal RAMs 15A and 15B, the built-in control registers and the built-in status registers in both of the CPUs 10A and 10B can be made to coincide with each other. Consequently, the data processing apparatus is advantageous also in that the necessity for separate control for the master CPU 10A and the slave CPU 10B is eliminated and control for recovery processing can be performed readily and with certainty.

It is to be noted that, while, in the embodiment described above, the output comparison circuit 13, the output comparison check inhibition circuit 18 and the system control circuit 20 are provided separately from the MCU 11, the functions of the output comparison circuit 13, the output comparison check inhibition circuit 18 and the system control circuit 20 may otherwise be built in the MCU 11.

Further, while, in the embodiment described above, the data processing apparatus includes dual CPUs (processing sections), the present invention is not limited to the specific configuration and can be applied also to a data processing apparatus which includes three or more multiple CPUs. Also in this instance, similar advantages to those of the embodiment described above can be achieved.

The present invention is not limited to the specifically described embodiment, and variations and modifications may be made without departing from the scope of the present invention.

What is claimed:

1. A data processing apparatus, comprising:

a plurality of multiplex processing sections including a corresponding plurality of built-in RAMs for performing redundant operation;

a comparison section for comparing outputs of said processing sections to produce a result;

a control section for controlling said processing sections to perform the redundant operation, confirming based on the result of comparison by said comparison section that said processing sections are performing the redundant operation, and stopping the processing of said plurality of processing sections when the result of comparison by said comparison section indicates that the outputs of said processing sections do not coincide;

a built-in RAM error detection section for detecting an error in any of said built-in RAMs; and an inhibition section for inhibiting said comparison section from producing the result in response to the detecting of an error in any of said built-in RAMs by said built-in RAM error detection section.

2. A data processing apparatus as claimed in claim 1, wherein, when the result of comparison by said comparison section is inhibited by said inhibition section, recovery processing to correct the built-in RAM error is performed by a corresponding processing section, while comparison of the outputs of said processing sections is continued by said comparison section.

3. A data processing apparatus as claimed in claim 1, wherein said inhibition section includes:

a logical OR gate providing an OR function to built-in RAM error detection signals received from said processing sections and outputting a comparison inhibition signal; and a logical AND gate providing an AND function to the result output from said comparison section and an inverted comparison inhibition signal output from said logical OR gate and outputting an output comparison error signal.

4. A data processing apparatus as claimed in claim 2, wherein said control section performs the recovery processing to correct the built-in RAM error of the corresponding processing section in response to information received from a master processing section.

5. A data processing apparatus as claimed in claim 4, further comprising:

a resetting section for resetting said plurality of processing sections other than said master processing section when said built-in RAM error detection section detects a built-in RAM error.

6. A data processing apparatus as claimed in claim 5, further comprising a flag representing whether or not resetting processing by said resetting section originates from a built-in RAM error.

7. A data processing apparatus as claimed in claim 4, wherein said control section interrupts said plurality of processing sections other than said master processing section by executing an instruction at a predetermined interruption address.

8. A data processing apparatus as claimed in claim 5, wherein said control section re-starts said plurality of processing sections simultaneously in response to detection of the built-in RAM error.

9. A data processing apparatus as claimed in claim 4, wherein the recovery processing by said control section includes:

data saving processing for saving data of a built-in control register and a built-in status register corresponding to said master processing section into a main storage section; and data writing processing for writing the data saved in said main storage section into a built-in control register and a built-in status register, respectively, corresponding to said plurality of processing sections other than said master processing section.

10. A data processing apparatus as claimed in claim 9, wherein the data saved in said main storage section is written into said plurality of processing sections simultaneously.

11. A data processing apparatus as claimed in claim 4, wherein each of said built-in RAMs which are used as a translation lookaside buffer or a cache memory are invalidated during recovery processing.

12. A data processing apparatus as claimed in claim 2, wherein the recovery processing against the built-in RAM error is performed on firmware by an operating system.

13. A data processing apparatus, comprising:

a plurality of multiplex processing sections each having a built-in RAM and a built-in RAM error detection section;

a comparison section which compares outputs of said built-in RAMs and produces a result in response thereto;

a control section which stops said plurality of processing sections when the result produced by said comparison section indicates that the outputs of said built-in RAMs do not coincide; and an inhibition section which inhibits said comparison section from producing the result when any of said built-in RAM error detection sections detects an error.

14. A data processing apparatus, comprising:

a plurality of multiplex processing sections each having a built-in RAM and a built-in RAM error detection section;

comparing and stopping means for comparing outputs of said built-in RAMs and stopping said plurality of processing sections when the outputs of said built-in RAMs do not coincide; and an inhibition section which inhibits said comparing and stopping means from stopping when any of said built-in RAM error detection sections detects an error.

* * * * *